(12) United States Patent
Tanaka

(10) Patent No.: US 6,571,655 B2
(45) Date of Patent: Jun. 3, 2003

(54) INVOLUTE GEAR PAIR STRUCTURE

(75) Inventor: Kazuo Tanaka, Toyohashi (JP)

(73) Assignee: Juken Kogyo Co., Ltd., Aichi-ken (JP)

( * ) Notice: Subject to any disclaimer, the term of this patent is extended or adjusted under 35 U.S.C. 154(b) by 0 days.

(21) Appl. No.: 09/916,669

(22) Filed: Jul. 26, 2001

(65) Prior Publication Data

US 2003/0019315 A1 Jan. 30, 2003

(51) Int. Cl.⁷ .............................................. F16H 55/08
(52) U.S. Cl. .............................. 74/462; 74/457; 74/460
(58) Field of Search .......................... 74/462, 460, 468, 74/457, DIG. 10

(56) References Cited

U.S. PATENT DOCUMENTS

| | | | | |
|---|---|---|---|---|
| 4,051,492 A | * | 9/1977 | Laskin et al. ................. | 396/40 |
| 4,644,814 A | * | 2/1987 | Rouverol ...................... | 74/462 |
| 4,825,715 A | * | 5/1989 | Buczek et al. ................ | 74/462 |
| 4,969,371 A | * | 11/1990 | Allen ........................... | 74/462 |
| 5,271,289 A | * | 12/1993 | Baxter, Jr. .................... | 74/462 |
| 5,423,232 A | * | 6/1995 | Miller et al. ............... | 74/421 R |
| 5,546,824 A | * | 8/1996 | Miller et al. ............... | 74/421 R |
| 5,605,518 A | * | 2/1997 | Kogure et al. .............. | 475/344 |
| 6,101,892 A | * | 8/2000 | Berlinger Jr. et al. ........ | 74/462 |
| 6,276,226 B1 | * | 8/2001 | Fujiwara ...................... | 74/462 |

* cited by examiner

Primary Examiner—Lenard A. Footland
Assistant Examiner—Justin Stefanon
(74) Attorney, Agent, or Firm—Jordan and Hamburg LLP

(57) ABSTRACT

In an involute tooth profile pair structure, a pinion has a smaller pressure angle at its addendum than at its dedendum, and a pressure angle at an addendum of a gear wheel is equal to the pressure angle at the dedendum of the pinion, and a pressure angle at a dedendum of the gear wheel is equal to the pressure angle at the addendum of the pinion.

17 Claims, 6 Drawing Sheets ly to an involute spur gear pair each gear mating with the other and made of a plastic material for use in an environment suffering large temperature changes, a smaller one of the involute gear pair having 16 or less gear teeth. The present invention is applicable more particularly to an involute gear pair each made of a plastic material having a different coefficient of linear expansion.

INVOLUTE GEAR PAIR STRUCTURE

BACKGROUND OF THE INVENTION

1. Field of the Invention

The present invention relates generally to an involute spur gear pair each gear mating with the other and made of a plastic material for use in an environment suffering large temperature changes, a smaller one of the involute gear pair having 16 or less gear teeth. The present invention is applicable more particularly to an involute gear pair each made of a plastic material having a different coefficient of linear expansion.

2. Description of the Related Art

Shifted gears are small gears having 16 or less gear teeth in order to obviate an occurrence of undercutting in their manufacture. The positive shift brings about a shorter dedendum and a larger circular tooth thickness, allowing the occurrence of undercutting to be prevented or suppressed.

FIG. 3 shows a state of engagement of shifted gears having a pressure angle of 20 degrees, consisting of a small gear, i.e., a pinion with 10 gear teeth and a large gear, i.e., a gear wheel with 61 gear teeth. Similarly, FIG. 4 depicts a state of engagement of shifted gears having a pressure angle of 12 degrees.

In the state of the large pressure angle (20 degrees) of FIG. 3, the undercutting of the pinion can be prevented by virtue of the shift. However, this results in a shorter addendum and consequently in a small contact ratio.

On the contrary, in the state of the small pressure angle (12 degrees) of FIG. 4, an addendum becomes longer but undercuts occur in roots of the teeth, resulting in a reduced pinion strength. In the event that such gears are made of plastic, the undercuts become necked, so that resin material, when cooled and contracted upon injection molding, makes die cutting impossible and manufacture of the gears difficult.

In this manner there have not hitherto existed any practical plastic involute gears which are available for use in applications having large temperature changes, with an increased contact ratio, under conditions where the pinion has an extremely small number of gear teeth. Especially, in the case of an involute gear pair, each made of a plastic material having a different coefficient of linear expansion, engagement may often become infeasible due to a change in the environmental temperature.

SUMMARY OF THE INVENTION

It is therefore an object of the present invention to develop and provide gears capable of overcoming the above deficiencies.

In order to attain the above object, according to the present invention there is provided an involute gear pair structure including a smaller number of first tooth profiles and a larger number of second tooth profiles, the first tooth profiles meshing with the second tooth profiles for transmission, wherein each of the first tooth profiles has at its addendum an involute tooth profile with the pressure angle $\alpha_1$ and has at its dedendum an involute tooth profile with the pressure angle $\alpha_2$ where $\alpha_1 < \alpha_2$, and wherein each of the second tooth profiles has at its addendum an involute tooth profile with the pressure angle $\alpha_3$ and has at its dedendum an involute tooth profile with the pressure angle $\alpha_4$ where $\alpha_3 = \alpha_2$ and $\alpha_4 = \alpha_1$.

In the involute gear pair, the number of the first tooth profiles is 16 or less, with the first tooth profiles being shifted in the positive direction, and the number of the second tooth profiles is 25 or more, with the second tooth profiles being shifted in the negative or positive direction or unshifted. The involute gear pair is made of plastic materials.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

The present invention will now be described with reference to the accompanying drawings which illustrate presently preferred embodiments thereof in a non-limitative manner.

Figure 1:
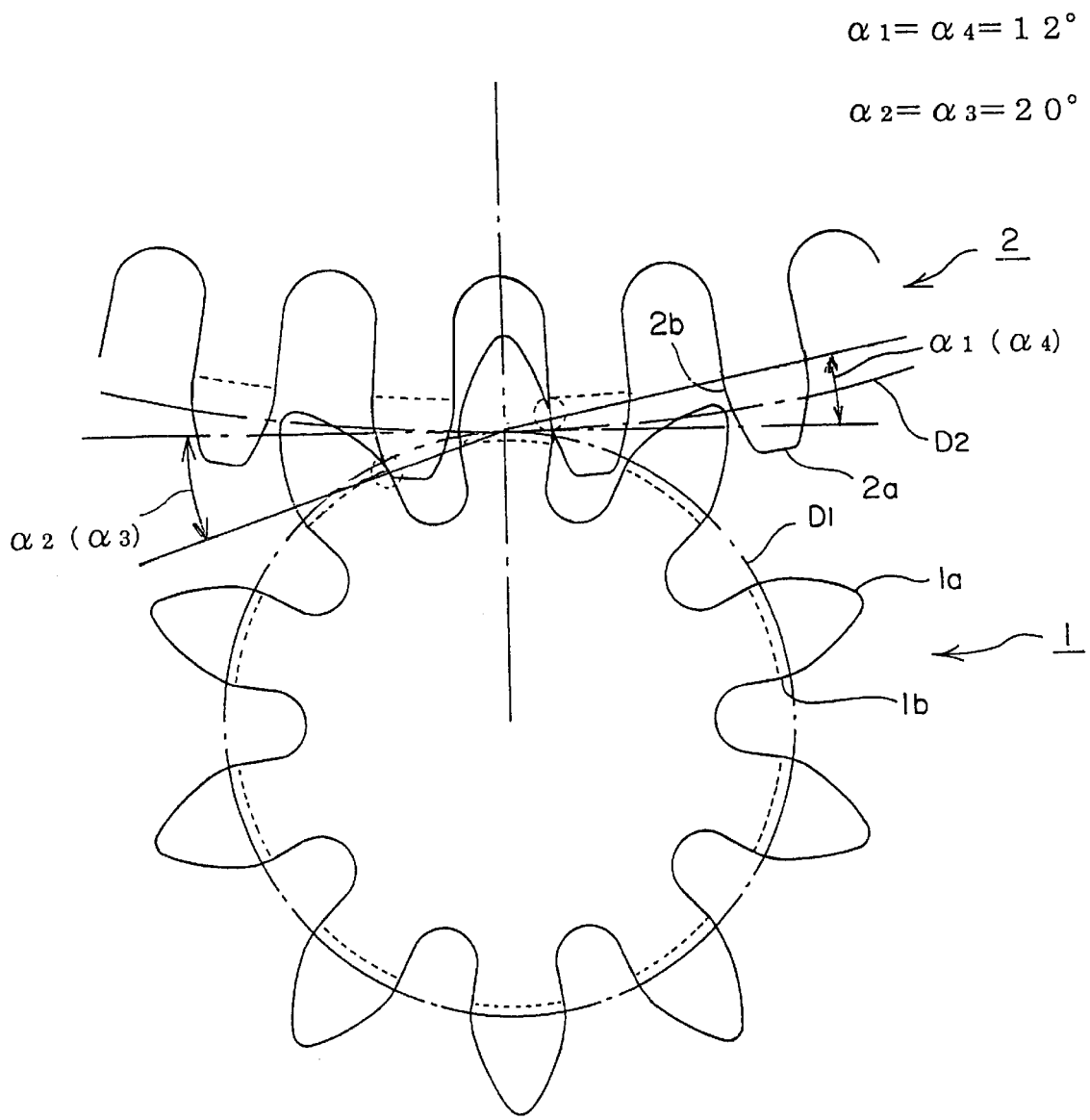
FIG. 1 is an enlarged top plan view of an involute tooth profile pair in accordance with the present invention.
Figure 2:
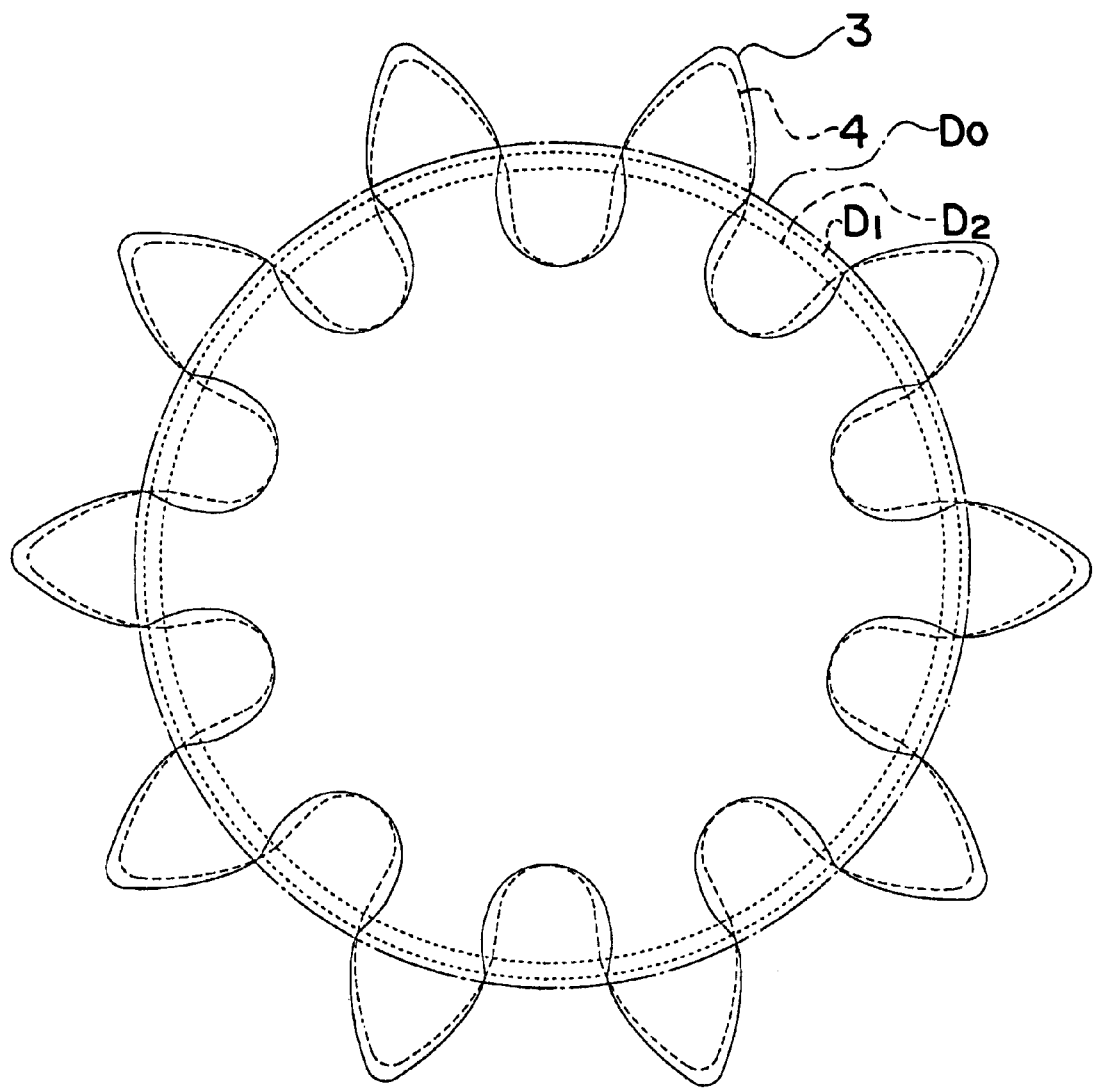
FIG. 2 is a reference diagram detailing the involute tooth profile pair in accordance with the present invention.
Figure 3:
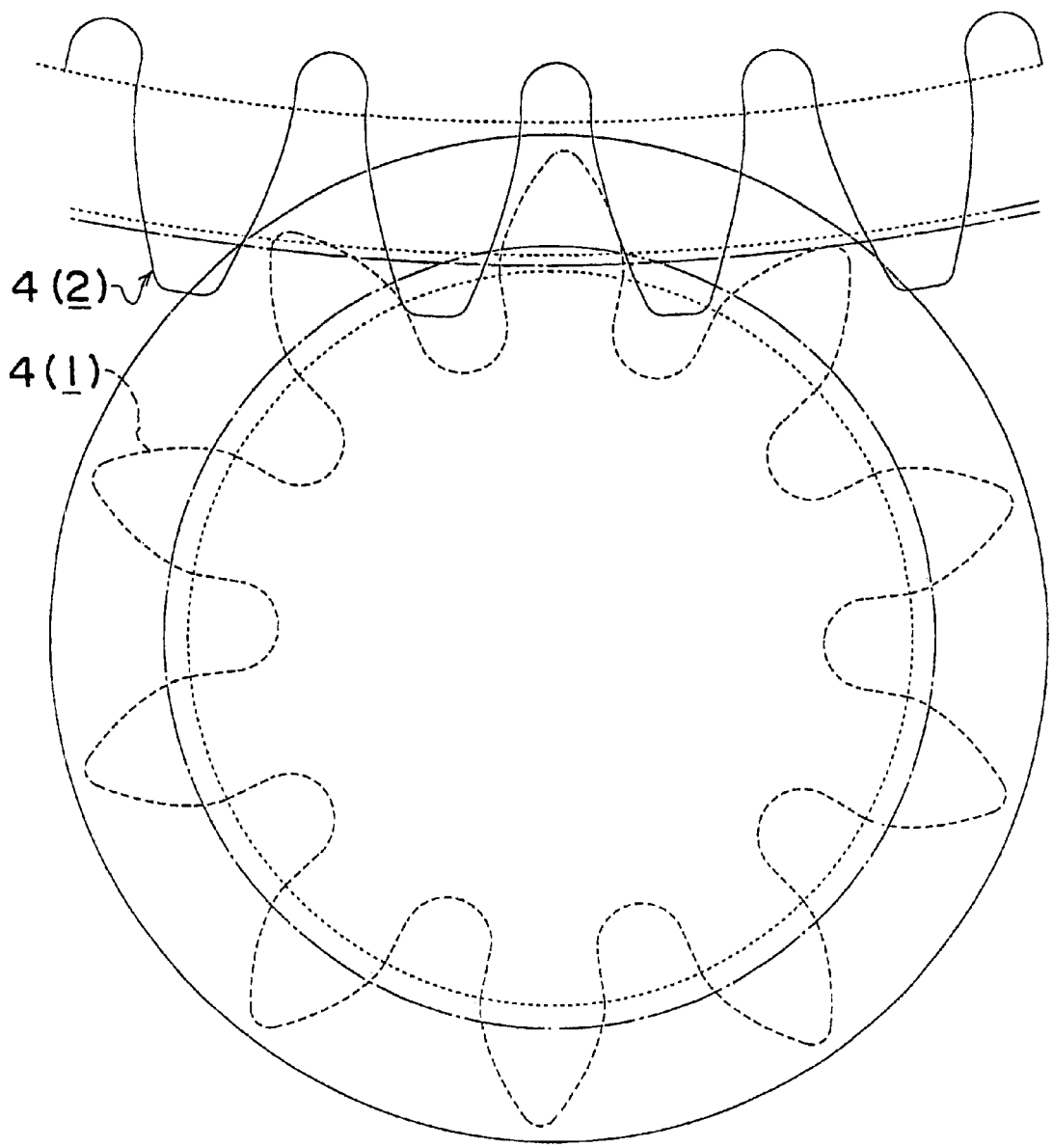
FIG. 3 shows a state of engagement of a conventional shifted gear pair including a pinion with 10 gear teeth and a gear wheel with 61 gear teeth, with a pressure angle of 20 degrees.
Figure 4:
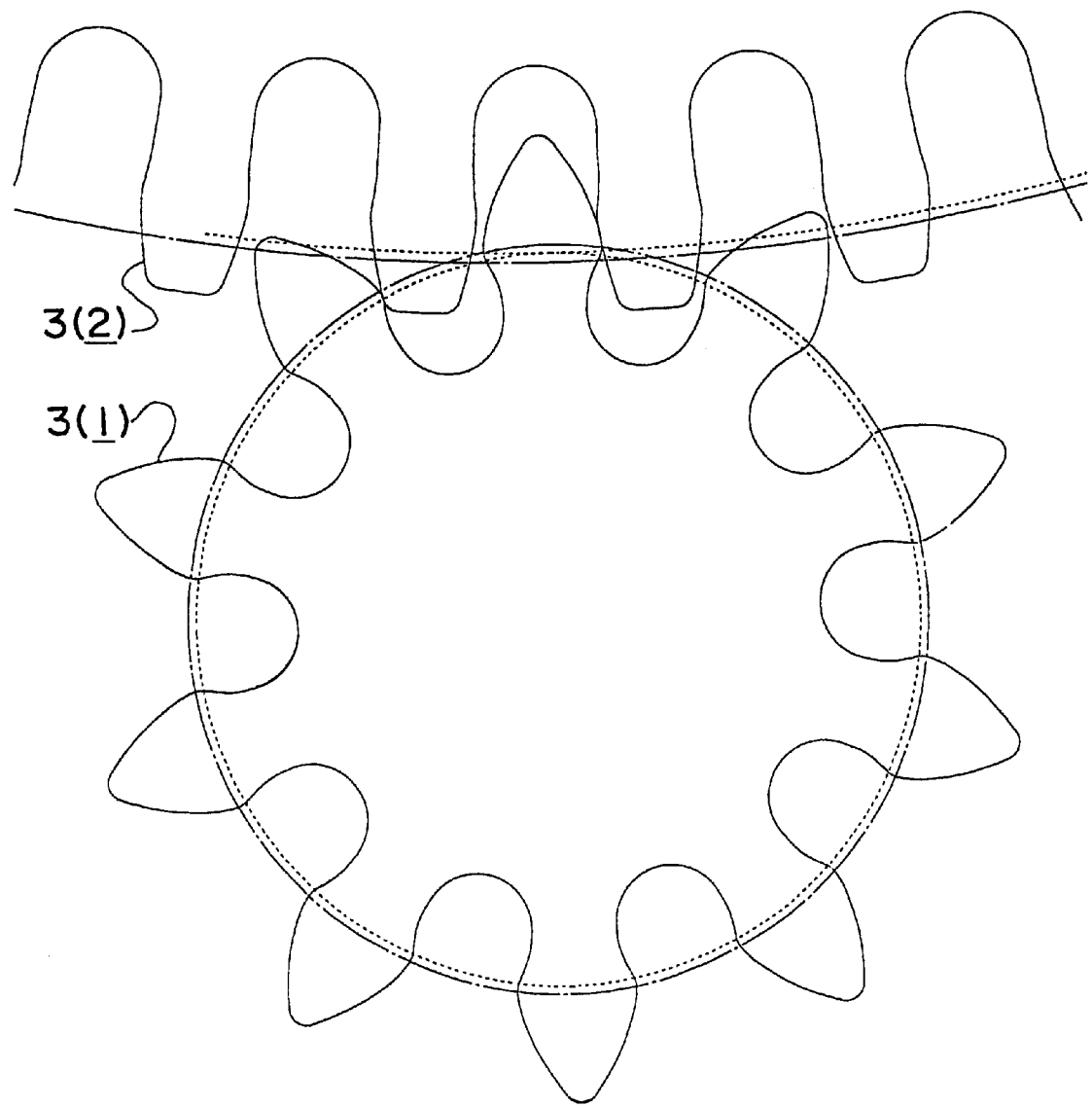
FIG. 4 shows a state of engagement of a conventional shifted gear pair including a pinion with 10 gear teeth and a gear wheel with 61 gear teeth, with the pressure angle of 12 degrees.

FIG. 1 is an enlarged top plan view showing a principal part of an involute gear pair in accordance with the present invention, and FIG. 2 is a reference diagram for comparatively explaining the operative function of the gears of the present invention.

Referring to FIG. 1, a first tooth profile 1 makes up a pinion having 10 gear teeth. With respect to a basic circle $D_1$ of a first pressure angle, the first tooth profile 1 includes an addendum-side involute tooth profile 1a with the pressure angle of 12 degrees and a dedendum-side involute tooth profile 1b with the pressure angle of 20 degrees. The addendum-side involute tooth profile 1a has a positive shift coefficient of 0.6 and the dedendum-side involute tooth profile 1b has a positive shift coefficient of 0.3.

A second tooth profile 2 makes up a gear wheel having 61 gear teeth by way of example. With respect to its basic circle $D_2$, the second tooth profile 2 includes an addendum-side involute tooth profile 2a with the pressure angle of 20 degrees and a dedendum-side involute tooth profile 2b with the pressure angle of 12 degrees. The addendum-side involute tooth profile 2a has a negative shift coefficient of −0.53 and the dedendum-side involute tooth profile 2b has a negative shift coefficient of −0.818.

In this example, the first tooth profile 1 has a reference pitch circle diameter of 0.9 mm and the second tooth profile 2 has a reference pitch circle diameter of 11.59 mm. The module is 0.19.

The addendum of the pinion (first tooth profile 1) employs the 12-degree pressure angle of a tooth profile 3 having a first pressure angle indicated by a solid line in FIG. 2 which is the reference diagram. The dedendum thereof employs 20-degree pressure angle of a tooth profile 4 having a second pressure angle indicated by a broken line. This allows the pinion to have an increased dedendum strength and an elongated addendum, thereby improving the contact ratio as much as possible to secure a smooth engagement.

Figure 5:
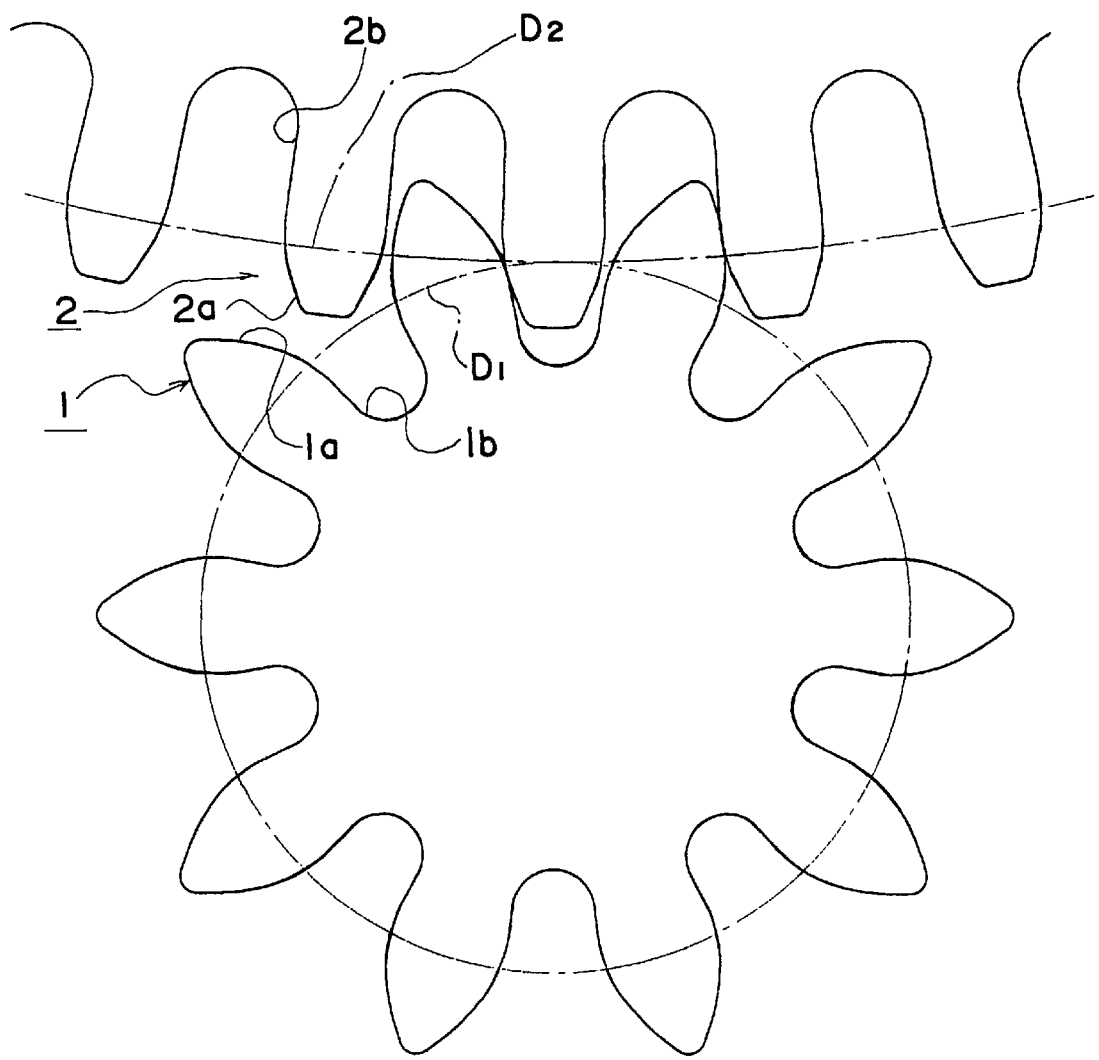
FIG. 5 is an enlarged top plan view of another involute tooth profile pair in accordance with the present invention.

Referring then to FIG. 5 which illustrates another embodiment of the present invention, the pinion (first tooth profile 1) has 10 gear teeth and the gear wheel (second tooth profile 2) has 61 gear teeth by way of example. These are essentially the same as those in FIG. 1.

Figure 6:
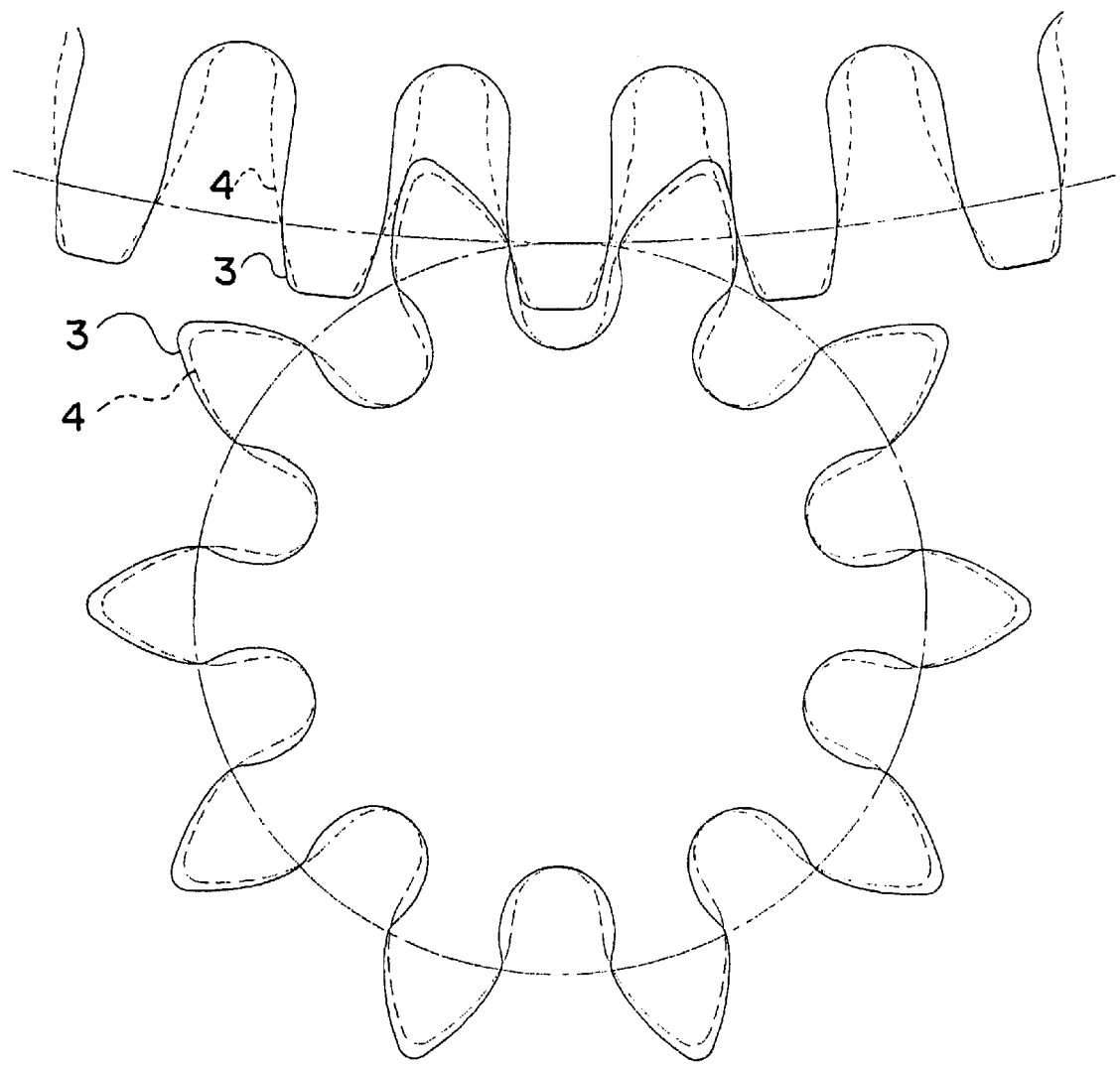
FIG. 6 is a reference diagram for explaining the another involute tooth profile pair in accordance with the present invention.

An addendum of this pinion (first tooth profile 1) employs a 12-degree pressure angle of a tooth profile 3 having a first pressure angle indicated by a solid line in FIG. 6 which is the reference diagram. A dedendum thereof employs a 20-degree pressure angle of a tooth profile 4 having a second pressure angle indicated by a broken line. This allows the pinion to have an increased dedendum strength and an elongated addendum, thereby improving the contact ratio as much as possible to secure a smooth engagement.

According to the involute gear pair structure of the present invention, the first tooth profile 1 of the pinion having a low number of gear teeth ensures a sufficient dedendum strength and achieves a smooth transmission with increased contact ratio. More specifically, the increased pressure angle at the dedendum of the pinion can eliminate the undercutting thereat and the reduced pressure angle at the addendum can elongate the addendum to add to the contact ratio. In addition, the involute tooth profile at both the addendum and dedendum ensures a secure transmission and easy manufacture.

Due to the larger number of gear teeth of the gear wheel having the second tooth profile 2 there arises no problems involving strength even though the pressure angle at its dedendum is smaller than that at its addendum.

According to a further feature of the present invention, the number of the first tooth profile 1 is 16 or less and the tooth profiles are shifted in the positive direction, with the result that the addendum becomes longer but the dedendum becomes shorter to add to the gear thickness, thereby preventing the undercut to enable the pinion to have an increased strength.

The number of the second tooth profile 2 is 25 or more to secure a large gap between a top of the gear wheel and a bottom of the pinion, thereby enabling a normal engagement to be kept even though the axis-to-axis distance becomes shorter as a result of a change of the environmental temperature. Furthermore, a longer axis-to-axis distance can also keep the normal engagement. The reason is that the pinion has a longer addendum with a longer dedendum of the gear wheel meshing with the pinion.

The invention further provides that the involute gear pair structure includes gears made of plastic materials. According to this invention, it is possible to prevent the undercuts to eliminate the necks at the dedendum of both the pinion and the gear wheel, whereupon the products can be released from a mold even though the resin material contracts as a result of cooling and hardening. This enables plastic gears having a high reliability and a high precision to be provided.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An involute gear pair structure including a smaller number of first tooth profiles and a larger number of second tooth profiles, said first tooth profiles meshing with said second tooth profiles for transmission, wherein
    each of said first tooth profiles has an addendum having an involute tooth profile with a constant pressure angle $\alpha_1$ throughout the addendum and has a dedendum having an involute tooth profile with a constant pressure angle $\alpha_2$ throughout the dedendum, where $\alpha_1 < \alpha_2$, and wherein
    each of said second tooth profiles has an addendum having an involute tooth profile with a constant pressure angle $\alpha_3$ throughout the addendum and has a dedendum having an involute tooth profile with a constant pressure angle $\alpha_4$ throughout the dedendum, where $\alpha_3 = \alpha_2$ and $\alpha_4 = \alpha_1$.

2. The involute gear pair structure according to claim 1, wherein
    the number of said first tooth profiles is 16 or less, with said first tooth profiles being shifted in the positive direction, and wherein
    the number of said second tooth profiles is 25 or more, with said second tooth profiles being shifted in the negative or positive direction or unshifted.

3. The involute gear pair structure according to claim 1, wherein
    said involute gear pair is made of plastic materials.

4. The involute gear pair structure according to claim 2, wherein
    said involute gear pair is made of plastic materials.

5. An involute gear pair structure comprising:
    a pinion gear having a first number of teeth each having a same first tooth profile;
    a gear wheel having a second number of teeth each having a same second tooth profile, said first tooth profile meshing with said second tooth profile, and said second number of teeth being greater than said first number of teeth;
    said first tooth profile having a first pitch circle defining a first addendum having a first involute tooth profile with a constant pressure angle $\alpha_1$ throughout the first addendum, and the first pitch circle defining a first dedendum having a second involute tooth profile with a constant pressure angle $\alpha_2$ throughout the first dedendum, where $\alpha_1 < \alpha_2$; and
    said second tooth profile having a second pitch circle defining a second addedendum having a third involute tooth profile with a constant pressure angle $\alpha_3$ throughout the second addendum, and said second pitch circle defining a second dedendum having a fourth involute tooth profile with a constant pressure angle $\alpha_4$ throughout the second dedendum, where $\alpha_3 = \alpha_2$ and $\alpha_4 = \alpha_1$.

6. The involute gear pair structure according to claim 5, wherein
    said first number of teeth is 16 or less;
    said first tooth profile is shifted in a positive direction; and
    said second number of teeth is 25 or more.

7. The involute gear pair structure according to claim 6 wherein said second tooth profile is shifted in a negative direction.

8. The involute gear pair structure according to claim 7, wherein said involute gear pair is made of plastic materials.

9. The involute gear pair structure according to claim 6, wherein said constant pressure angle $\alpha_1$ is 12 degrees and said constant pressure angle $\alpha_2$ is 20 degrees.

10. The involute gear pair structure according to claim 9, wherein said involute gear pair is made of plastic materials.

11. The involute gear pair structure according to claim 5, wherein said constant pressure angle $\alpha_1$ is 12 degrees and said constant pressure angle $\alpha_2$ is 20 degrees.

12. The involute gear pair structure according to claim 11, wherein said involute gear pair is made of plastic materials.

13. The involute gear pair structure according to claim 5, wherein said first number of teeth is 10 or less;

said first tooth profile is shifted in a positive direction; and said second number of teeth is 61 or more.

14. The involute gear pair structure according to claim 13 wherein said second tooth profile is shifted in a negative direction.

15. The involute gear pair structure according to claim 14, wherein said involute gear pair is made of plastic materials.

16. The involute gear pair structure according to claim 13, wherein said constant pressure angle $\alpha_1$ is 12 degrees and said constant pressure angle $\alpha_2$ is 20 degrees.

17. The involute gear pair structure according to claim 16, wherein said involute gap if plastic materials.

* * * * *